(12) United States Patent
Nakata et al.

(10) Patent No.: US 11,161,039 B2
(45) Date of Patent: Nov. 2, 2021

(54) COMMUNICATION SYSTEM, COMMUNICATION DEVICE, STORAGE MEDIUM, AND COMMUNICATION METHOD

(71) Applicant: NINTENDO CO., LTD., Kyoto (JP)

(72) Inventors: Tetsuya Nakata, Kyoto (JP); Tomohiro Nishino, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 18 days.

(21) Appl. No.: 16/654,301

(22) Filed: Oct. 16, 2019

(65) Prior Publication Data

US 2020/0122030 A1 Apr. 23, 2020

(30) Foreign Application Priority Data

Oct. 17, 2018 (JP) .............................. JP2018-195660

(51) Int. Cl.
*A63F 13/34* (2014.01)
*H04L 29/06* (2006.01)
*A63F 13/352* (2014.01)
*A63F 13/795* (2014.01)

(52) U.S. Cl.
CPC .............. *A63F 13/34* (2014.09); *H04L 67/38* (2013.01); *A63F 13/352* (2014.09); *A63F 13/795* (2014.09); *A63F 2300/408* (2013.01); *A63F 2300/513* (2013.01)

(58) Field of Classification Search
CPC ...... A63F 13/34; A63F 13/352; A63F 13/795; A63F 2300/408; A63F 2300/513; H04L 67/38; H04W 4/08
See application file for complete search history.

(56) References Cited

U.S. PATENT DOCUMENTS

| | | | |
|---|---|---|---|
| 9,331,960 B2 | 5/2016 | Nakata et al. | |
| 2001/0044339 A1* | 11/2001 | Cordero | A63F 13/34 463/42 |
| 2004/0162871 A1* | 8/2004 | Pabla | H04L 67/04 709/201 |
| 2005/0059491 A1* | 3/2005 | Oh | H04L 67/38 463/42 |
| 2006/0107295 A1* | 5/2006 | Margis | H04N 21/44204 725/81 |
| 2008/0115121 A1* | 5/2008 | Douceur | H04L 67/1059 717/168 |

(Continued)

FOREIGN PATENT DOCUMENTS

JP 6336732 5/2018

*Primary Examiner* — Kevin Y Kim
(74) *Attorney, Agent, or Firm* — Nixon & Vanderhye, P.C.

(57) ABSTRACT

A communication system includes a group setting means, a first communication means, and a second communication means. The group setting means sets groups such that each of devices belongs to one of first-type groups, and to one of second-type groups. The first communication means enables, in each of the first-type groups, each of devices belonging to a first-type group to send its own data to other devices belonging to the same first-type group as the device. The second communication means enables, in each of the second-type groups, each of devices belonging to a second-type group to send its own data and data received from other devices belonging to a same first-type group as the device, to other devices belonging to the same second-type group as the device.

19 Claims, 8 Drawing Sheets

(56) References Cited

U.S. PATENT DOCUMENTS

2011/0106921 A1\* 5/2011 Brown ................ H04L 67/1095
709/221
2016/0036792 A1\* 2/2016 Henning ................ H04L 63/08
713/168

\* cited by examiner

| NODE NUMBER | DEVICE ID |
|---|---|
| 11 | 00001 |
| 12 | 00002 |
| 13 | 00003 |
| ⋮ | ⋮ |
| 53 | 00023 |
| 54 | 00024 |
| 55 | 00025 |

COMMUNICATION SYSTEM, COMMUNICATION DEVICE, STORAGE MEDIUM, AND COMMUNICATION METHOD

CROSS REFERENCE TO RELATED APPLICATIONS

The disclosure of Japanese Patent Application No. 2018-195660, filed on Oct. 17, 2018, is incorporated herein by reference.

FIELD

An embodiment of the present disclosure relates to a method of communication performed between communication devices.

BACKGROUND AND SUMMARY

In the art of computer networks a mesh network is known.

A communication system according to an embodiment of the present disclosure is a communication system in which devices communicate with each other, the communication system comprising at least one processor configured to execute: setting groups such that each of the devices belongs to one of at least one first-type group, and to one of at least one second-type group; performing first communication processing whereby in each of the at least one first-type group, each of the devices sends its own data to other devices belonging to the same first-type group; and performing second communication processing whereby in each of the at least one second-type group, each of the devices sends its own data and data received from other devices belonging to the same first-type group, to other devices belonging to the same second-type group.

DETAILED DESCRIPTION OF NON-LIMITING EXAMPLE EMBODIMENTS

1. Embodiment

1-1. Configuration

Figure 1:
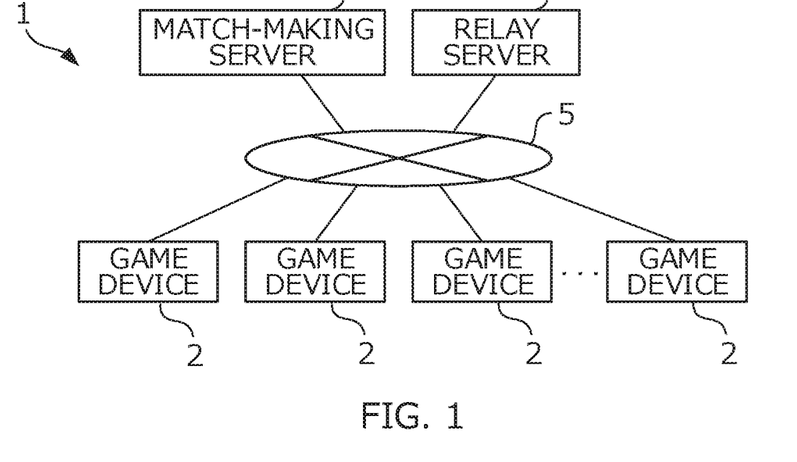
FIG. 1 is a diagram showing an example of a configuration of communication network 1.

A communication system 1 according to an embodiment of the present disclosure will now be described with reference to the figures. FIG. 1 is a block diagram showing an example of a configuration of communication system 1. Communication system 1 shown in the drawing includes plural game devices 2, match-making server 3, and relay server 4, and enables multi-play of a game. As used herein, the term multi-play refers to simultaneous participation in a game by multiple players via a communication network. Players who wish to participate in multi-play enter one of plural virtual rooms created on match-making server 3. In each of the plural virtual rooms multi-play is performed. Games that can be multi-played include battle games and cooperative games.

Among the components of communication system 1, match-making server 3 is a server used for grouping players for participation in multi-play. Relay server 4 is a relay device used to relay communication between plural game devices 2. The components of communication system 1 are connected via communication network 5 such as the Internet for communication with each other. One of the plural game devices 2 will be described in detail.

Figure 2:
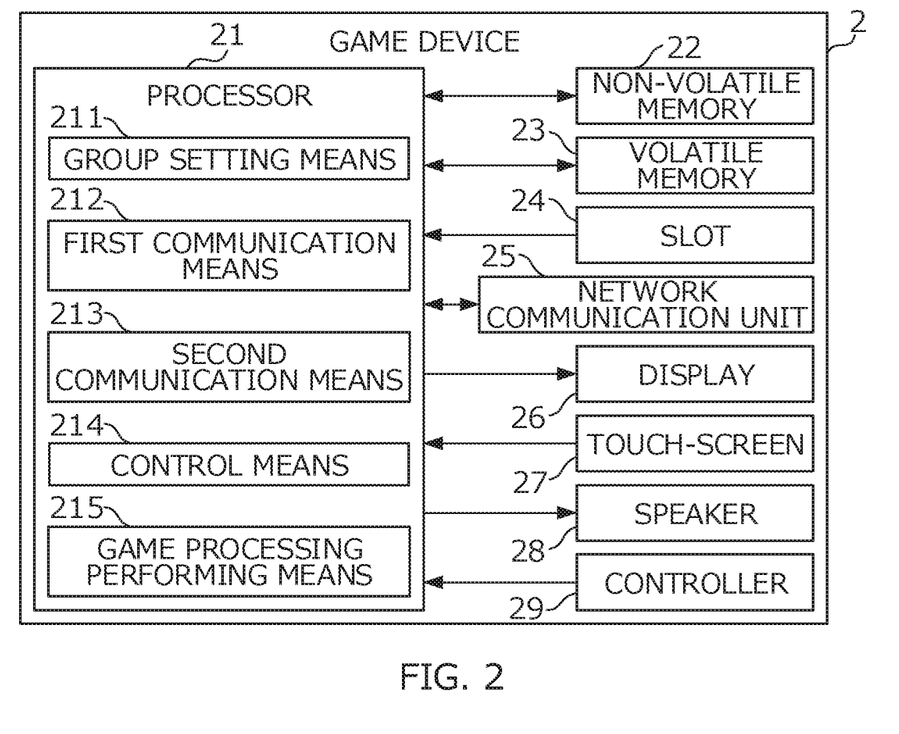
FIG. 2 is a block diagram showing an example of a configuration of game device 2.

The plural game devices 2 are computer game devices that each have a communication function. By sharing game data with each other via peer to peer (P2P) communication, the plural game devices 2 are able to participate in multi-play. FIG. 2 is a block diagram showing an example of a configuration of one of the plural game devices 2. The game device 2 shown in the diagram includes processor 24 such as a CPU or a GPU, non-volatile memory 22 such as a flash memory, volatile memory 23 such as a DRAM, slot 24 into which an external storage medium such as a memory card can be inserted, network communication unit 25 for performing wireless communication with an external device via communication network 5, display 26 such as a liquid crystal display or an organic EL display, touch-screen 27 provided at the top of display 26, speaker 28, and controller 29 consisting of operation buttons or an analog stick.

Figure 3:
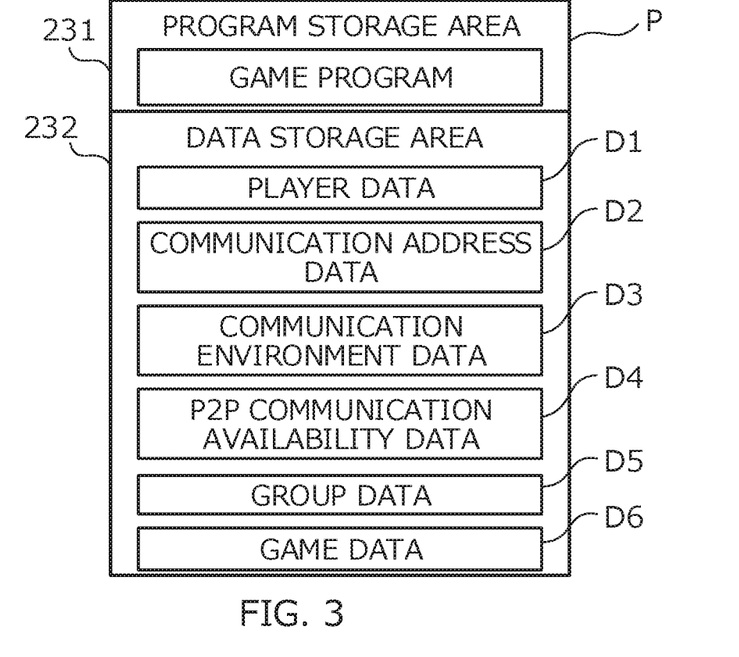
FIG. 3 is a block diagram showing an example of a memory map of volatile memory 23.

FIG. 3 is a block diagram showing an example of a memory map of volatile memory 23. Volatile memory 23 shown in the diagram includes program storage area 231 and data storage area 232. Program storage area 231 is used for storage of game program P, which enables multi-play to be performed. The program can be loaded from non-volatile memory 22 or from an external storage medium. Game program P is distributed via a network such as the Internet or by use of a non-transitory storage medium. On the other hand, data storage area 232 is used for storage of various data that enable multi-play to be performed. Specifically, data storage area 232 is used for storage of player data D1, communication address data D2, communication environment data D3, P2P communication availability data D4, group data D5, and game data D6.

Player data D1 indicates user IDs of players participating in multi-play. Player data D1 is acquired from match-making server 3.

Communication address data D2 indicates IP addresses of game devices 2 participating in multi-play. Communication address data D2 is acquired from relay server 4.

Communication environment data D3 identifies one of the plural game devices 2 that is unable to perform P2P communication with another of the plural game devices 2 (hereafter referred to as a "P2P communication disabled device"). Specifically, the data consists of a variety of information that relates to network address translation (NAT). The term P2P communication disabled device refers to, for example, one of the plural game devices 2 that is unable to perform UDP communication, or to one of the plural game devices 2 that is within a communication environment that does not satisfy conditions for P2P communication. Communication environment data D3 is acquired from a communication environment determination server (not shown).

P2P communication availability data D4 indicates, for each of the plural game devices 2 participating in multi-play, availability of P2P communication among each of the participating ones of the plural game devices 2. The data indicates which ones of the plural game devices 2 is unable to perform communication. P2P communication availability data D4 indicates "available" in a case where communication environment data D3 indicates that P2P communication is available and P2P communication has succeeded. Otherwise, the data indicates "unavailable."

Group data D5 is data that indicates, for each of the plural game devices 2 participating in multi-play, groups of the plural game devices 2 that perform P2P communication with each other. Group data D5 will be described in detail later.

Game data D6 relates to a multi-play game. For example, game data D6 indicates positions in a virtual space and states of characters operated by players. Game data D6 includes game data generated in a player's game device 2, which is one of the plural game devices 2, and also game data generated in other of the plural game devices 2.

Game program P loaded into program storage area 231 is executed by processor 21 to realize functions of group setting means 211, first communication means 212, second communication means 213, control means 214, and game processing performing means 215.

Figure 4:
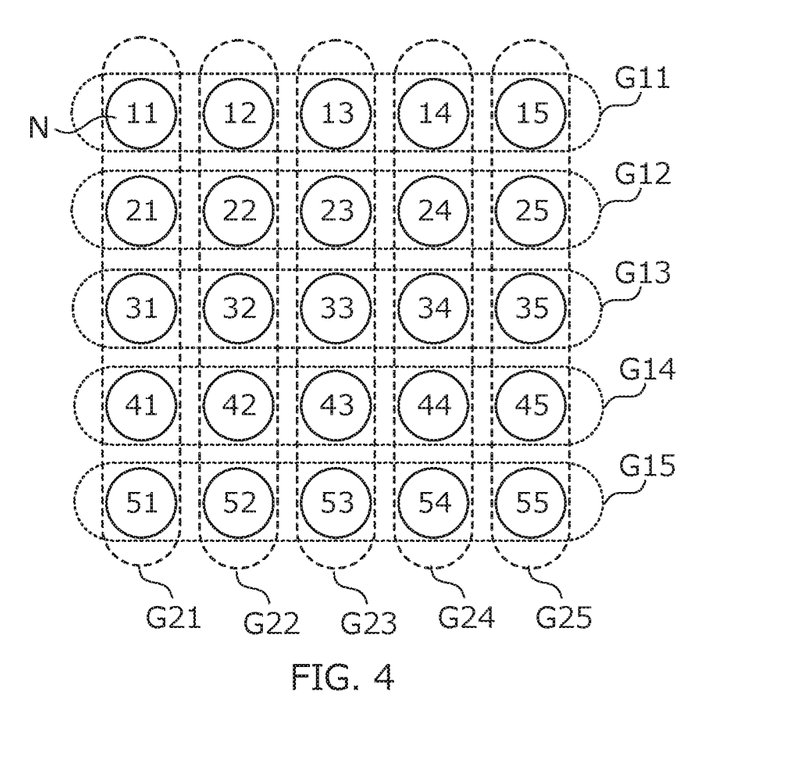
FIG. 4 is a diagram showing an example of groups set by group setting means 211.

Group setting means 211 sets, for each of the plural game devices 2 designated for participation in multi-play, groups in which the designated ones of the plural game devices 2 perform P2P communication with each other. Specifically, group setting means 211 sets groups such that each of the designated ones of the plural game devices 2 for participation in multi-play may belong to any one of at least one first-type group, and to any one of at least one second-type group. The first-type group and the second-type group constitute a full mesh network. FIG. 4 is a diagram showing an example of groups set by group setting means 211. Circular nodes N11 to N55 shown in the drawing, which are arranged in a two-dimensional lattice form, represent game devices 2. Each of nodes N may belong to any one of five first-type groups G11 to G15 and to any one of five second-type groups G21 to G25. For example, node N11 may belong to first-type group G11 and to second-type group G21.

When setting groups, group setting means 211 refers to P2P communication availability data D4 to ensure that those of the plural game devices 2 that are able to communicate with each other belong to the same group. Also, group setting means 211 sets groups such that each of the plural game devices 2 belongs to a first-type group and to a second-type group, wherein the first-type group differs from the second-type group in their combination of game devices 2. More specifically, group setting means 211 sets groups such that each of game devices 2 belongs to a first-type group and to a second-type group, wherein the other game devices 2 forming the first-type group do not overlap the other game devices 2 forming the second-type group. For example, in the example shown in FIG. 4, first-type group G11 includes nodes N11, N12, N13, N14, and N15, while second-type group G21 includes nodes N11, N21, N31, N41, and N15. For node N11 included in both of the groups, the other nodes N differ between the two groups.

Also, group setting means 211 sets groups such that a first-type group and a second-type group consist of the same or a similar number of the plural game devices 2. In other words, group setting means 211 sets groups such that the number of first-type groups is equal or close to the number of second-type groups. For example, in a case where 64 of the plural game devices 2 participate in multi-play, group setting means 211 sets the number of constituent devices of a first-type group and that of a second-type group to 8 each, not 16 and 4. This is because more efficient communication is attained in the former case than is attained in the latter. When determining the number of constituent devices for each group, group setting means 211, for example, calculates a square root of a total number of the plural game devices 2 for participation in multi-play.

When setting groups, group setting means 211 also refers to communication environment data D3 to ensure that P2P communication disabled devices belong to a P2P communication disabled group included in first-type groups.

Figure 5:
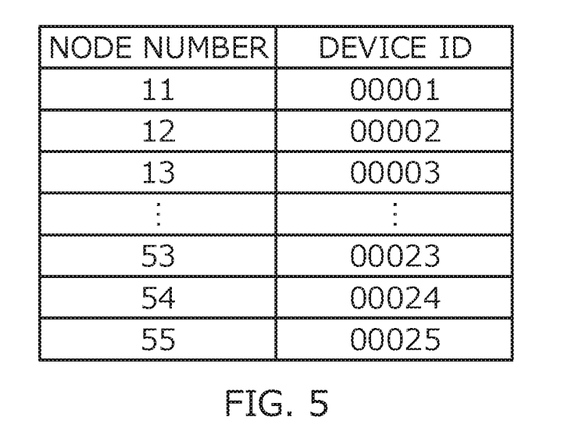
FIG. 5 is a diagram showing an example of group data D5.

After completing a group setting, group setting means 211 stores group data D5 for set groups in volatile memory 23. Group setting means 211 also sends group data D5 to each of the plural game devices 2 for participation in multi-play. FIG. 5 is a diagram showing an example of group data D5, which indicates the groups shown in FIG. 4. The group data D5 shown in the drawing is depicted in a list format, in which a device ID of each of plural game devices 2 is assigned a node number. Those of plural game devices 2 that have a same tenth-place digit node number belong to a same first-type group. Game devices 2 that have a same first-place digit node number belong to a same second-type group. Although not shown in FIG. 5, device IDs of the plural game devices 2 belonging to a P2P communication disabled group included in first-type groups are further associated with information indicating that those of the plural game devices 2 belong to the P2P communication disabled group.

First communication means 212 and second communication means 213 are means for performing P2P communication with other of the plural game devices 2 so that game data can be shared in real time during multi-play. Among the two means, first communication means 212 refers to group data D5 to send game data of the player's game device 2 directly to each all other of the plural game devices 2 belonging to a same first-type group as the player's game device 2. In addition, first communication means 212 receives game data from each of the all other of the plural game devices 2. Specific description is provided with reference to FIG. 4. Here it is assumed that the player's game device 2 corresponds to node N11, and node N11 sends its game data to each of nodes N12 to N15 belonging to the same first-type group G11 as node N11, and receives game data from each of nodes N12 to N15.

First communication means 212 stores the items of game data received from each of all the other of the plural game devices 2 in volatile memory 23.

During multi-play, when first communication means 212 detects that another game device 2 belonging to a same first-type group as the player's game device 2 has become a P2P communication disabled device, first communication means 212 performs processing to compensate for the P2P communication disabled device. Specifically, instead of sending game data for the player's game device 2 to the P2P communication disabled device, first communication means 212 sends the game data to one of the plural game devices 2 that belongs to a same second-type group as the P2P communication disabled device, as determined in accordance with a predetermined condition. The predetermined condition is set such that a processing load is not concentrated on those of the plural game devices 2 that belong to the same second-type group as the P2P communication disabled device. Specific description is now given with reference to FIG. 4. Assuming that the player's game device 2 corresponds to node N12, and node N11 has become a P2P communication disabled device, node N12 sends its game data to one of nodes N21, N31, N41, and N51, which belong to the same second-type group G21 as node N11. The one of the nodes N to which game data is sent is a node N that is capable of performing P2P communication with node N12. Each time node N12 sends game data to one of nodes N21, N31, N41, and NM, node N12 changes a destination in a round-robin manner thereby to distribute a processing load on the receiving side.

It is of note that first communication means 212 detects an existence of a P2P communication disabled device either by receiving an exit notification or by detecting a timeout.

First communication means 212 also performs the compensation processing, upon detecting that the player's game device 2 belongs to a first-type group, a number of constituent devices of which is smaller than a predetermined number. Description is now given with reference to FIG. 4. Assuming that the player's game device 2 corresponds to node NM, and node N55 does not exist, node NM sends its game data to one of nodes N15, N25, N35, and N45, which belong to the same second-type group G25 as node N55. Each time node NM sends game data, node NM changes a destination in a round-robin manner.

First communication means 212, upon detecting that the player's game device 2 belongs to a P2P communication disabled group included in first-type group, exchanges game data with other of the plural game devices 2 via relay server 4. Specifically, first communication means 212 sends game data of the player's game device 2 to all other of the plural game devices 2 belonging to the P2P communication disabled group via relay server 4. In addition, first communication means 212 receives game data from each of the all other of the plural game devices 2 via relay server 4. This is because those of the plural game devices 2 that belong to the P2P communication disabled group are not able to directly exchange data with each other.

Next, second communication means 213 refers to group data D5 to send game data of the player's game device 2 and items of game data received from all other of the plural game devices 2 that belong to a same first-type group as the player's game device 2, directly to all other of the plural game devices 2 that belong to a same second-type group as the player's game device 2. In addition, second communication means 213 receives, from each of the all other of the plural game devices 2 that belong to the second-type group, game data of the each of the all other game devices 2 and items of game data that the each of the all other game devices 2 has received from all other game devices belonging to a same first-type group. Processing of second communication means 213 is specifically described with reference to FIG. 4. Assuming that the player's game device 2 corresponds to node N11, node N11 sends its game data and items of game data received from nodes N12 to N15 belonging to same first-type group G11 as node N11, to each of nodes N21, N31, N41 and NM belonging to same second-type group G21 as node N11. In addition, node N11 receives, from each of nodes N21, N31, N41, and NM, game data of the node N and items of game data that the node N has received from all other nodes N belonging to a same first-type group G1 as the node N. For example, node N11 receives, from node N21, game data of node N21 and items of game data that node N21 has received from nodes N22 to N25 belonging to the same first-type group G12 as node N21.

Second communication means 213 stores the items of game data received from the other of the plural game devices 2 in volatile memory 23.

Second communication means 213, upon detecting that the player's game device 2 belongs to a P2P communication disabled group included in first-type groups, exchanges game data with other of the plural game devices 2 via relay server 4. Specifically, second communication means 213 sends, via relay server 4, game data of the player's game device 2 and items of game data received from all other of the plural game devices 2 that belong to a same first-type group as the player's game device 2, to all other of the plural game devices 2 that belong to a same second-type group as the player's game device 2. In addition, second communication means 213 receives, via relay server 4, from each of the all other of the plural game devices 2 that belong to the second-type group, game data of the each of the all other of the plural game devices 2 and items of game data that the each of the all other of the plural game devices 2 has received from all other game devices belonging to a same first-type group.

Now, control means 214 controls execution of communication processing of first communication means 212 and second communication means 213. Specifically, control means 214 causes first communication means 212 and second communication means 213 to execute communication processing alternately at a predetermined cycle (for example, 100 ms cycle). In addition, control means 214 synchronizes communication processing of the player's game device 2 with those of other the plural game devices 2 during multi-play.

Game processing performing means 215 executes game processing by use of game data D6. Specifically, game processing performing means 215 generates a play screen based on game data D6 and causes display 26 to display the play screen. Game processing performing means 215 synchronizes a game event on the player's game device 2 with those of other of the plural game devices 2.

1-2. Operation

Now, operations of communication system 1 will be described. Specifically, an operation for setting groups for a multi-play, and a communication operation performed after the group setting will be described.

Figure 6:
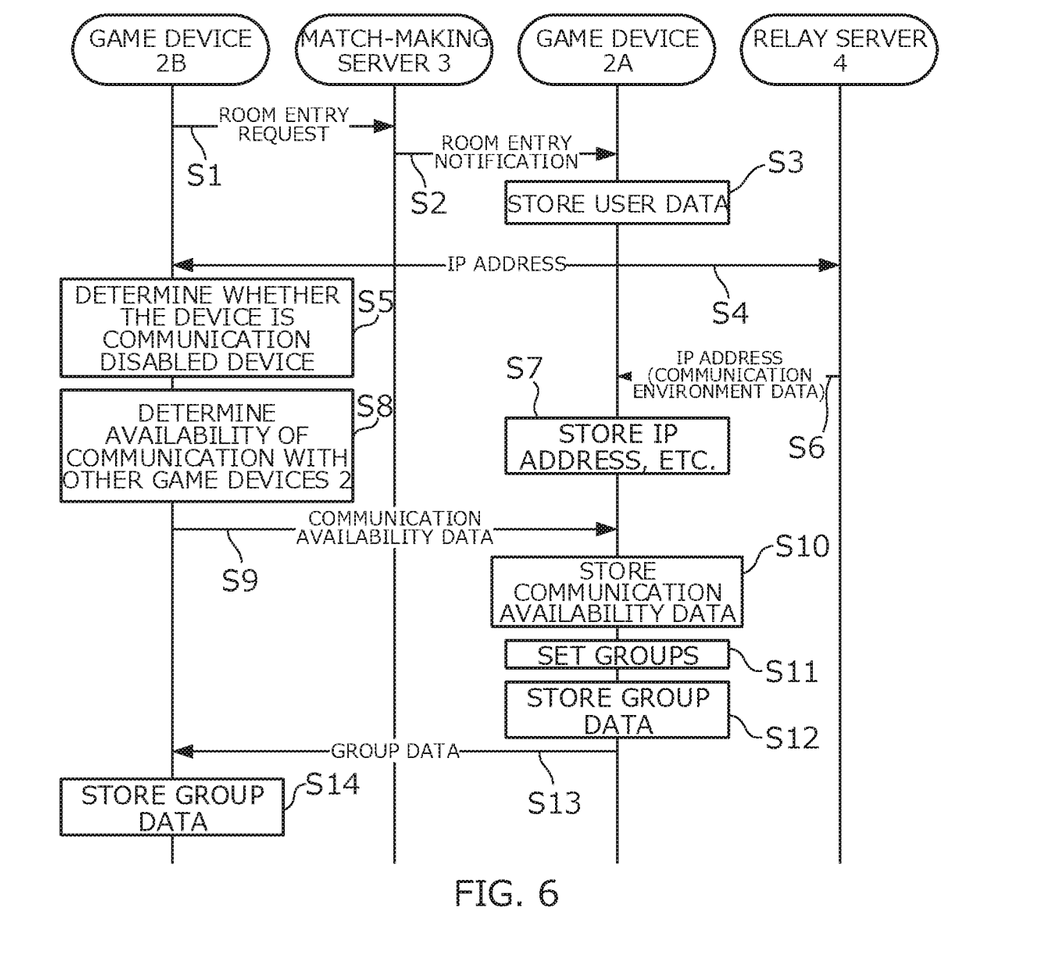
FIG. 6 is a sequence diagram showing an example of an operation for setting groups.

FIG. 6 is a sequence diagram showing an example of an operation for setting groups. Game devices 2A shown in the drawing constitute a master device that is operated by a player who has created a room at match-making server 3. Game devices 2B shown in the drawing constitute a client that is operated by a player who enters the room to participate in multi-play. It is of note that in FIG. 6, for ease of explanation only one client is shown.

Game device 2B that is to participate in a multi-play sends a room entry request to match-making server 3 (step S1). The room entry request includes a room ID of a desired room and a user ID of a player of game device 2B. When receiving the room entry request, match-making server 3 sends a room entry notification to game device 2A that created the desired room (step S2). The room entry notification includes the user ID of the player who has requested entry to the room. Upon receiving the room entry notification, game device 2A stores data that indicates the user ID of the player who has requested entry to the room in volatile memory 23 (step S3).

Game device 2B sends its own IP address to relay server 4, and receives from relay server 4 IP addresses of other of the plural game devices 2 that are to participate in multi-play (step S4). Game device 2B determines its own communication environment by sending determination transmission data to the communication environment determination server for receipt of determination reception data from the server (step S5). In a case that game device 2B is a P2P communication disabled device, relay server 4 sends communication environment data to game device 2A, together with the IP address of game device 2B (step S6). Upon receiving the set of data, game device 2A stores the data in volatile memory 23 (step S7).

Game device 2B attempts to establish P2P communication with each of the other of the plural game devices 2 that are to participate in the multi-play (step S8). After that, game device 2B game device 2B sends communication availability data indicating availability of communication with the other of the plural game devices 2 to game device 2A (step S9). Upon receipt of the communication availability data, game device 2A stores the received data in volatile memory 23 (step S10).

Upon receipt of communication availability data from all of the other game devices 2 that are to participate in multi-play, game device 2A sets, for each of the game devices 2 that are to participate in multi-play, groups in which game devices 2 perform P2P communication with each other (step S11). Groups are set up as described above. After completing a group setting, game device 2A stores group data D5 on set groups in volatile memory 23 (step S12), and sends group data D5 to game device 2B that is to participate in multi-play (step S13). Upon receipt of group data D5, game device 2B stores the received data in volatile memory 23 (step S14).

The foregoing is a description of the operation for setting up groups.

In the above operation, steps S8 to S14 are performed at a predetermined cycle during multi-play.

Now, various examples of a communication operation performed after setting up a group will be described with reference to FIGS. 7 to 9. Circular nodes N11 to N55 shown in the drawings, and which are arranged in a two-dimensional lattice pattern, represent game device 2. Each of nodes N belongs to any one of five first-type groups G11 to G15 and to any one of five second-type groups G21 to G25. FIGS. 7A, 8A, and 9A show communication processing performed by first communication means 212, and FIGS. 7B, 8B, and 9B show communication processing performed by second communication means 213.

Figure 7A:
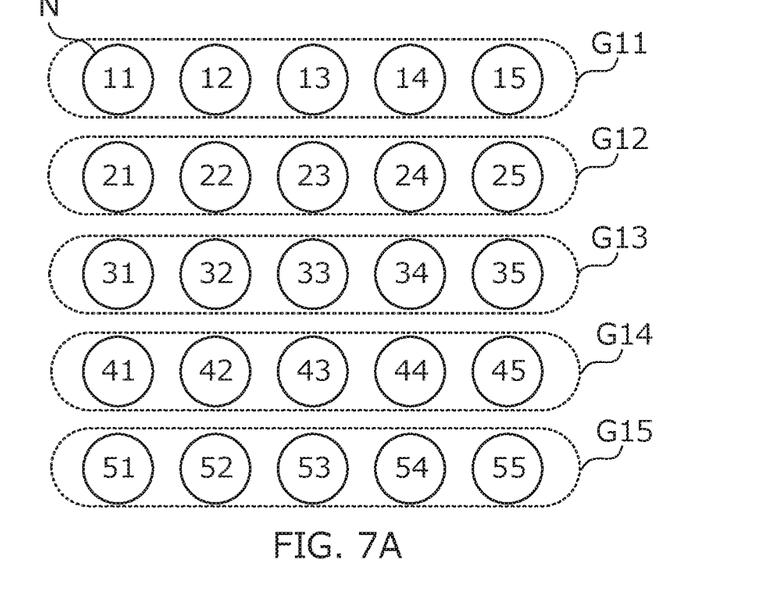
FIGS. 7A and 7B are diagrams showing an example of a communication operation.
Figure 7B:
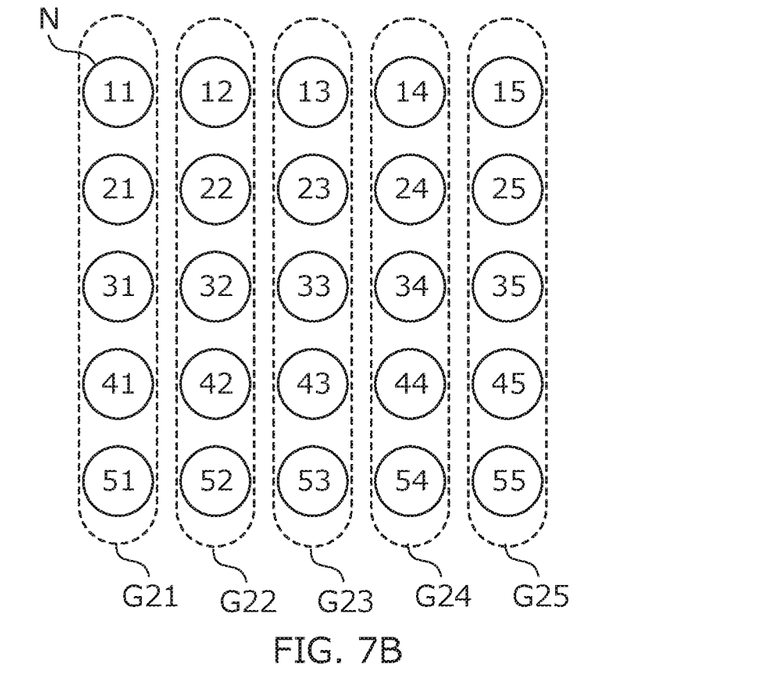

First, reference is made to FIGS. 7A and 7B. In communication processing shown in FIG. 7A, in each of first-type groups G11 to G15, each of nodes N belonging to a first-type group G1 sends its game data directly to the other nodes N belonging to the same first-type group G1 as the node N. Thus, as a result of this communication processing, for example, node N11 receives game data of nodes N12 to N15.

Subsequently, in communication processing shown in FIG. 7B, performed by second communication means 213, in each of second-type groups G21 to G25, each of nodes N belonging to a second-type group G2 sends its game data and items of game data received from all other nodes N belonging to a same first-type group as the node N, directly to all other nodes N belonging to the same second-type group as the node N. Thus, as a result of this communication processing, for example, node N11 receives game data of nodes N21 to N25 from node N21, receives game data of nodes N31 to N35 from node N31, receives game data of nodes N41 to N45 from node N41, and receives game data of nodes N51 to N55 from node N51. After setting up communication processing, node N11 receives game data of all of the other nodes N; namely, not only node N11, but each one of all nodes N11 to N55 receives game data of all of the other nodes N.

In the set of communication processing shown in FIGS. 7A and 7B, each one of all nodes N is required to send game data to a total of eight nodes N whereby all nodes N are able to share game data with each other. In other words, each node N is required to send a total of eight packets. Taking node N11 as an example, node N11 is required to send its game data to a total of eight nodes N including four nodes N12 to N15 and four nodes N21, N31, N41, and N51. On the other hand, in a conventional full mesh network, each of all nodes N is required to send game data to a total of 24 nodes N whereby all nodes N are able to share game data with each other. In other words, each node N is required to send a total of 24 packets. This is because in a conventional full mesh network, node N is required to send game data to all of the other 24 nodes N. Upon comparison with such an example it becomes apparent that use of the communication processing shown in FIGS. 7A and 7B achieves a substantial reduction in connection-count and packet-count by an amount of one third; in short, communication efficiency is greatly improved.

FIGS. 7A and 7B show communication processing performed in a case that the number of nodes is 25; however, improvement in communication efficiency is attained as long as the number of nodes is 4 or more. As another example, there is described a case in which the number of nodes is 64. In the case where the number of nodes is 64, a first-type group and a second-type group includes eight nodes, respectively, and thus each node is required to send game data to a total of 14 nodes. In other words, each node is required to send a total of 14 packets. In contrast, in a conventional full mesh network, each node is required to send game data to a total of 63 nodes. In other words, each node is required to send a total of 63 packets. Upon comparison with such an example it becomes apparent that use of the communication processing according to the present embodiment achieves a substantial reduction in connection-count and packet-count by an amount of two ninths; in short, communication efficiency is significantly improved.

Figure 8A:
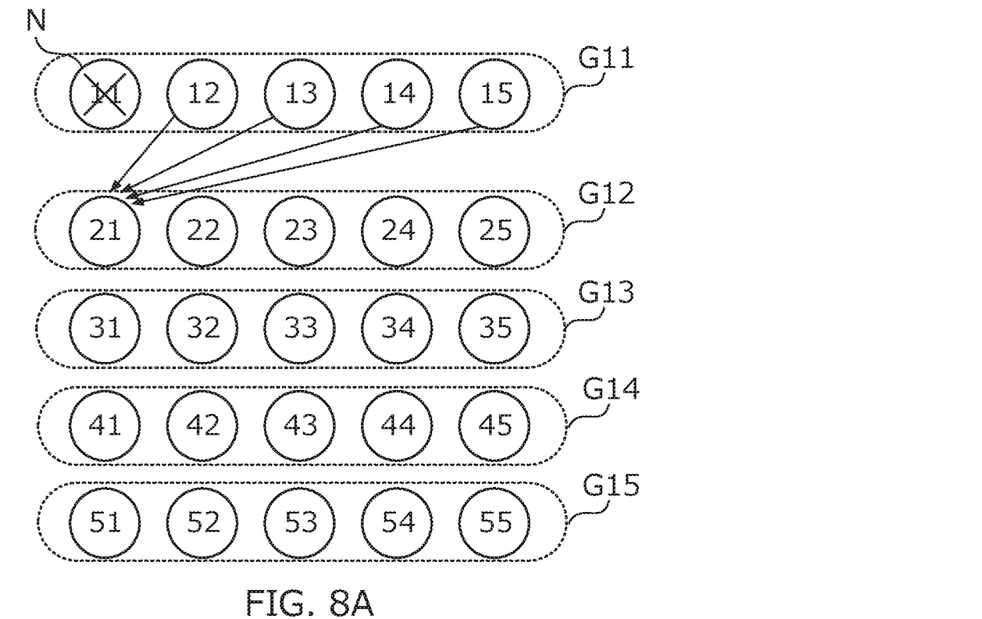
FIGS. 8A and 8B are diagrams showing an example of a communication operation.
Figure 8B:
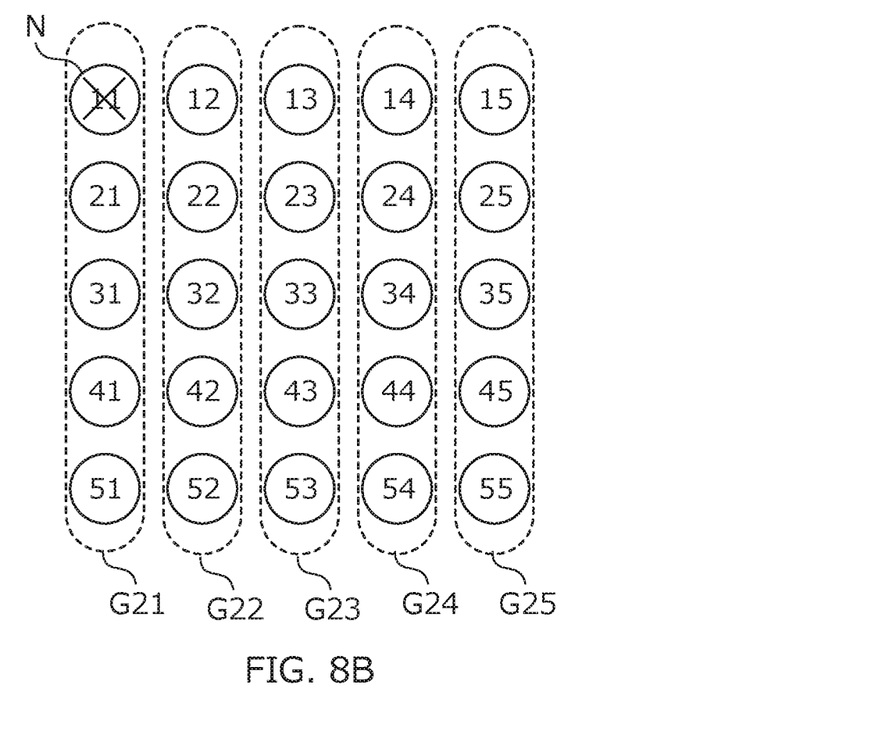

Next, reference is made to FIGS. 8A and 8B, which show an example of a communication operation performed when node N participating in multi-play has become a P2P communication disabled device. In the drawings, it is assumed that node N11 is a P2P communication disabled device.

In communication processing shown in FIG. 8A, performed by first communication means 212, in each of first-type groups G11 to G15, each of nodes N belonging to a first-type group G1 sends its game data to the other nodes N belonging to the same first-type group G1 as the node N. However, in first-type group G11, since node N11 is a P2P communication disabled device, each of nodes N12 to N15 sends its game data, instead of to node N11, to node N21, which belongs to the same second-type group G21 as node N11.

Subsequently, in communication processing shown in FIG. 8B, performed by second communication means 213, in each of second-type groups G21 to G25, each of nodes N belonging to a second-type group G2 sends its game data and items of game data received from all other nodes N belonging to a same first-type group as the node N, to all other nodes N belonging to the same second-type group as the node N. In second-type group G21, since node N11 is a P2P communication disabled device, nodes N21, N31, N41, and NM are unable to receive game data of first-type group G11 from node N11. However, since node N21, instead of node N11, receives game data of first-type group G11, as described above, nodes N31, N41, and NM are able to receive the game data of first-type group G11 from node N21. Accordingly, all nodes N other than node N11 are able to receive game data of all of the other nodes N, so that when a P2P communication disabled device appears during multi-play, the multi-play can be nonetheless continued.

Figure 9A:
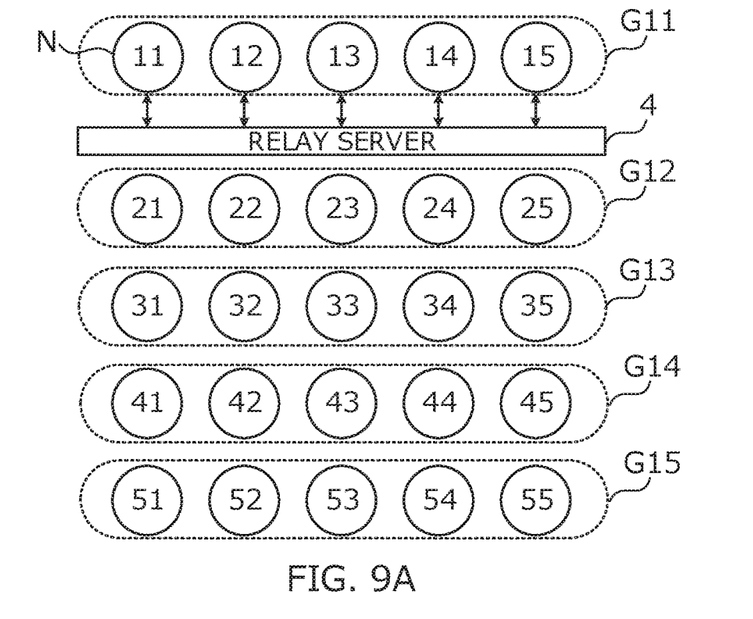
FIGS. 9A and 9B are diagrams showing an example of a communication operation.
Figure 9B:
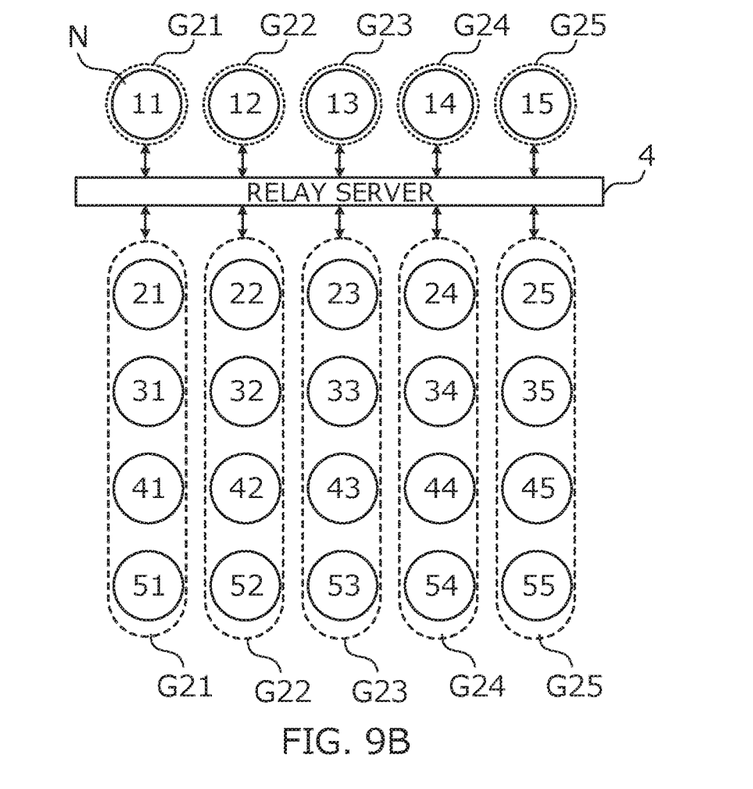

Third, reference is made to FIGS. 9A and 9B, in which there is shown an example of a communication operation that is performed in a case in which first-type groups G1 include a P2P communication disabled group. In the figures, it is assumed that first-type group G11 is a P2P communication disabled group.

In communication processing shown in FIG. 9A, and performed by first communication means 212, in each of first-type groups G11 to G15, each of nodes N belonging to a first-type group G1 sends its game data to the other nodes N belonging to the same first-type group G1 as the node N. However, in first-type group G11 that is a P2P communication disabled group, nodes N11 to N15 exchange game data with each other via relay server 4.

Subsequently, in communication processing shown in FIG. 9B, performed by second communication means 213, in each of second-type groups G21 to G25, each of nodes N belonging to a second-type group G2 sends its game data and items of game data received from all other nodes N belonging to a same first-type group as the node N, to all other nodes N belonging to the same second-type group as the node N. However, nodes N belonging to first-type group G11, which is a P2P communication disabled group, exchange game data with nodes N not belonging to first-type group G11, via relay server 4. Accordingly, all nodes N including nodes N belonging to the P2P communication disabled group are able to receive game data of all of the other nodes N, and thus game devices 2 belonging to the P2P communication disabled group are able to participate in multi-play.

The foregoing is a description of communication operations.

According to communication system 1 described in the foregoing, in which, in principle, game data is shared between plural game devices 2 by P2P communication, not via a server, a cost of operating the server is reduced. Also, as compared with a conventional full mesh network, as described above, each of a connection count and a packet count are reduced; in short, communication efficiency is improved. Also, since a connection count is reduced, a situation can be avoided whereby a number of participating players is necessarily restricted by limitations of routers. Also, when a P2P communication disabled device appears during multi-play, multi-play can be maintained, and any one of plural game devices 2 that belongs to a P2P communication disabled group is able to participate in multi-play, as described above.

2. Modifications

The above embodiment may be modified as described below. Two or more of the following modifications may be combined with each other.

2-1. Modification 1

The number of types of groups set by group setting means 211 may be three or more. Below, an exemplary case where three types of groups are set will be described.

Figure 10:
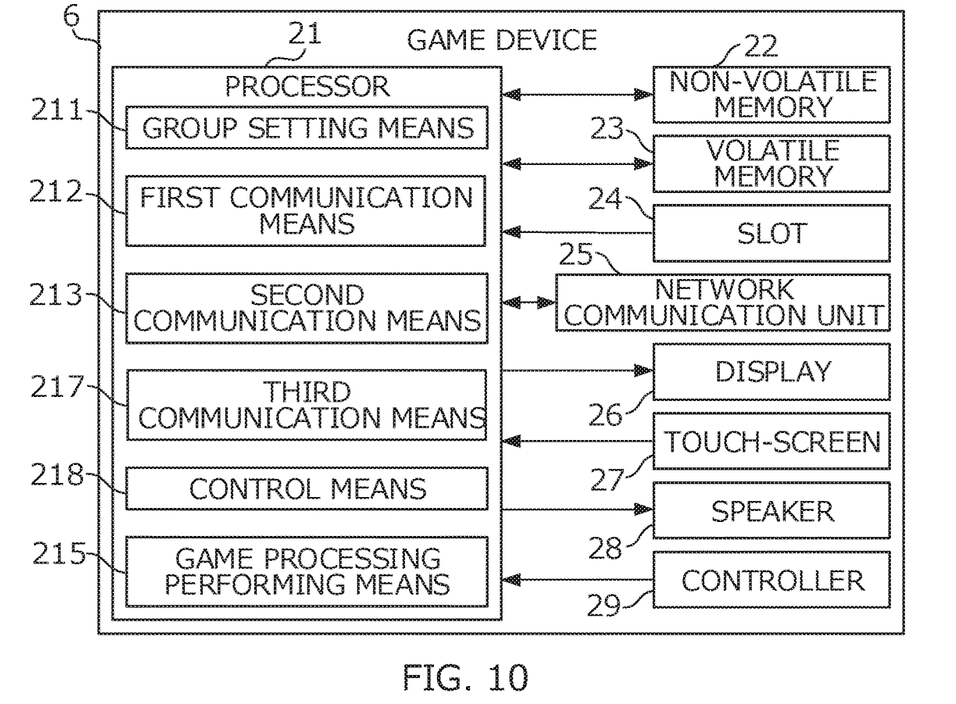
FIG. 10 is a block diagram showing an example of a configuration of game device 6.

FIG. 10 is a block diagram showing an example of a configuration of game device 6 that sets three types of groups. Game device 6 shown in the drawing differs from game device 2 described above in that it includes group setting means 216, third communication means 217, and control means 218.

Figure 11:
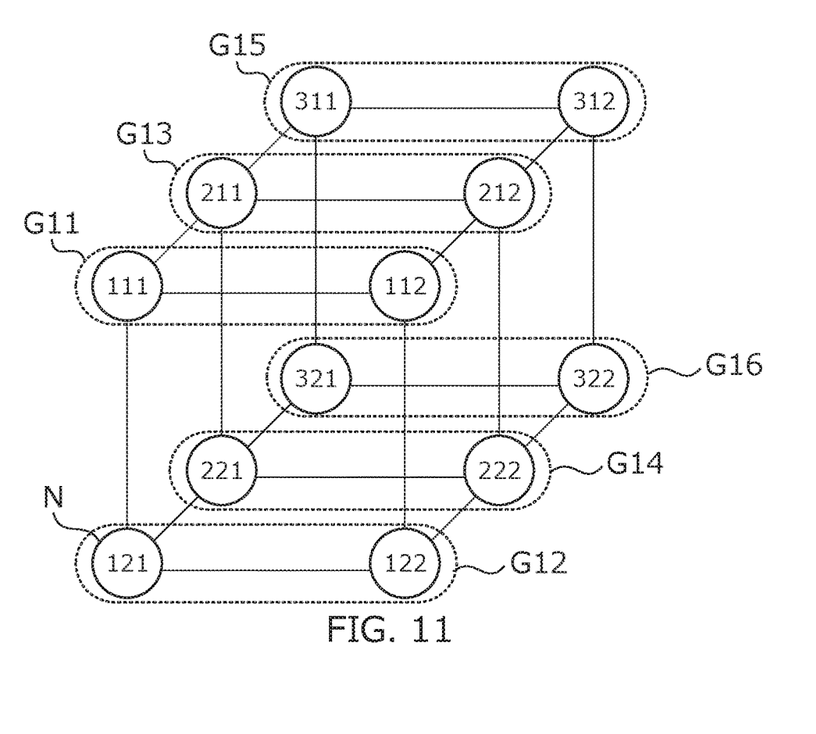
FIG. 11 is a diagram showing an example of groups set by group setting means 216.
Figure 12:
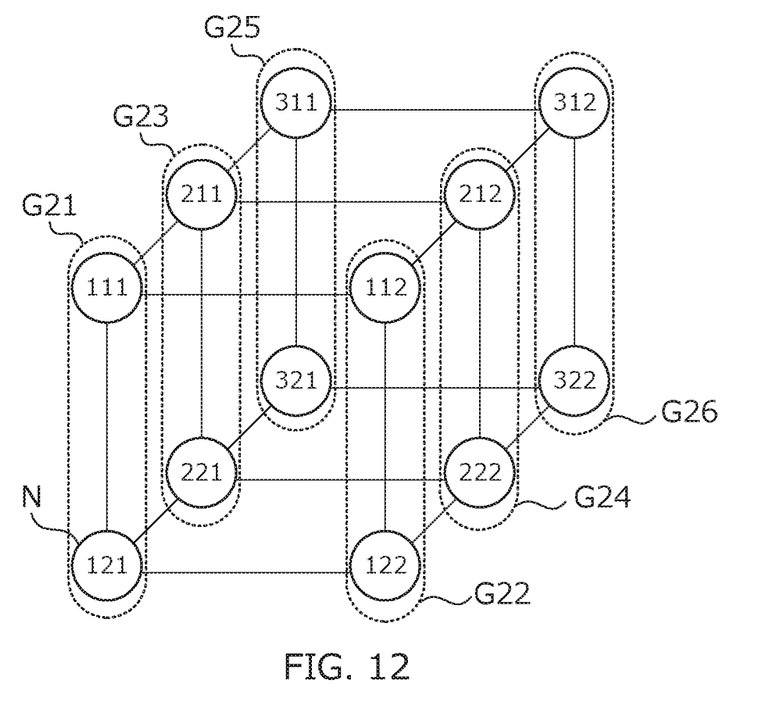
FIG. 12 is a diagram showing an example of groups set by group setting means 216.
Figure 13:
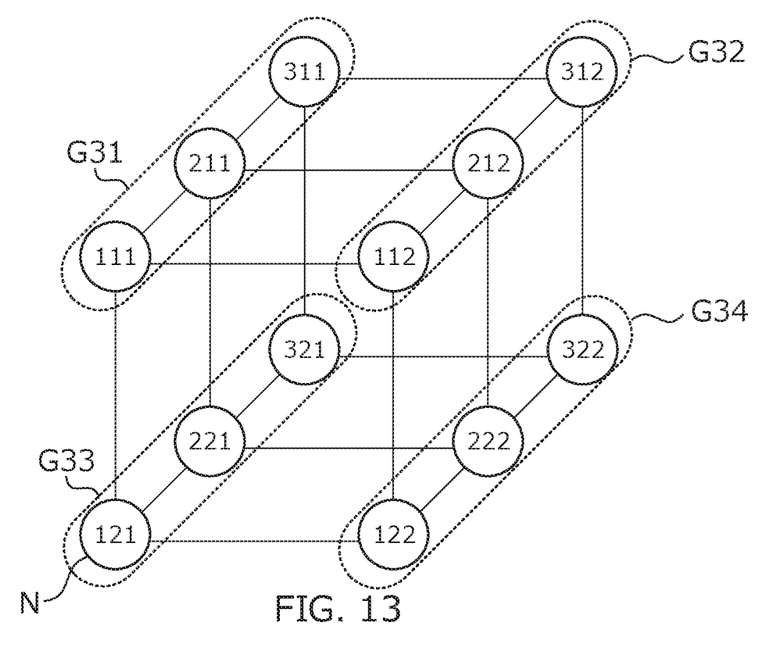
FIG. 13 is a diagram showing an example of groups set by group setting means 216.

Group setting means 216 included in game device 6 sets, for each of plural game devices 2 that are to participate in multi-play, groups in which game devices 6 perform P2P communication with each other. Specifically, group setting means 216 sets groups such that each of game devices 6 that are to participate in multi-play belong to: any one of at least one first-type group, any one of at least one second-type group, and any one of at least one third-type group. The first-type group, the second-type group, and the third-type group each constitute a full mesh network. FIGS. 11 to 13 are diagrams that show examples an example of groups set by group setting means 216. Circular nodes N111 to N322 shown in the drawings, which are arranged in a three-dimensional lattice form, represent game devices 6. Each of nodes N belongs to any one of six first-type groups G11 to G16, to any one of six second-type groups G21 to G26, and to any one of four three-type groups G31 to G34. For example, node N111 belongs to first-type group G11, to second-type group G21, and to third-type group G31.

When setting groups, group setting means 216 refers to P2P communication availability data D4 to ensure that game devices 6 that can communicate with each other belong to the same group. Also, group setting means 216 sets groups such that each of game devices 6 belongs to a first-type group, to a second-type group, and to a third-type group, wherein the three groups differ from each other in their combination of game devices 6. More specifically, group setting means 216 sets groups such that each of game devices 6 belongs to a first-type group, to a second-type group, and to a third-type group, wherein the other game devices 6 forming the first-type group, the other game devices 6 forming the second-type group, and the other game devices 6 forming the third-type group do not overlap each other.

Also, group setting means 216 sets groups such that a first-type group, a second-type group, and a third-type group are formed with a same or similar number of game devises 6. In other words, group setting means 216 sets groups such that the numbers of first-type groups, second-type groups, and third-type groups are equal or closer to each other. When determining a number of constituent devices of each group, group setting means 216, for example, calculates a third root of a total number of game devices 6 that are to participate in multi-play.

When setting groups, group setting means 216 also refers to communication environment data D3 to ensure that P2P communication disabled devices that belong to a P2P communication disabled group are included in first-type groups.

After completing a group setting, group setting means 216 stores group data D5 on set groups in volatile memory 23. Group setting means 216 also sends group data D5 to each of game devices 6 that are to participate in multi-play. The group data D5 is depicted in a list format, in which a device ID of each of game devices 6 is assigned a node number.

Now, third communication means 217 refers to group data D5 to send game data of the player's game device 6, items of game data received from all other game devices 6 belonging to a same first-type group as the player's game device 6, and items of game data received from all other game devices 6 belonging to a same second-type group as the player's game device 6, to all other game devices 6 belonging to a same third-type group as the player's game device 6. In addition, third communication means 217 receives, from each of the all other game devices 6 belonging to the third-type group, game data of the game device 6, items of game data that the game device 6 has received from all other game devices belonging to a same first-type group as the game device 6, and items of game data that the game device 6 has received from all other game devices belonging to a same second-type group as the game device 6.

The processing of third communication means 217 is specifically described with reference to FIGS. 11 to 13. Assuming that the player's game device 6 corresponds to node N111, node N111 sends its game data, game data received from node N112 belonging to same first-type group G11 as node N111, and game data received from node N121 belonging to same second-type group G21 as node N111, to each of nodes N211 and N311 belonging to same third-type group G31 as node N111. In addition, node N111 receives, from each of nodes N211 and N311, game data of the node N, game data that the node N has received from the other node N belonging to a same first-type group G1 as the node N, and game data that the node N has received from the other node N belonging to a same second-type group G2 as the node N. For example, node N111 receives, from node N211, game data of node N211, game data that node N211 has received from node N212 belonging to same first-type group G13 as node N211, and game data that node N211 has received from node N221 belonging to same second-type group G23 as node N211.

Third communication means 217 stores the items of game data received from the other game devices 6 in volatile memory 23.

Third communication means 2173, upon detecting that the player's game device 6 belongs to a P2P communication disabled group included in first-type groups, exchanges game data with other game devices 6 via relay server 4. Specifically, third communication means 217 sends, via relay server 4, game data of the player's game device 6, items of game data received from all other game devices 6 belonging to a same first-type group as the player's game device 6, and items of game data received from all other game devices 6 belonging to a same second-type group as the player's game device 6, to all other game devices 6 belonging to a same third-type group as the player's game device 6. In addition, third communication means 217 receives, via relay server 4, from each of the all other game devices 6 belonging to the third-type group, game data of the game device 6, items of game data that the game device 6 has received from all other game devices belonging to a same first-type group as the game device 6, and items of game data that the game device 6 has received from all other game devices belonging to a same second-type group as the game device 6.

Now, control means 218 controls execution of communication processing of first communication means 212, second communication means 213, and third communication means 217. Specifically, control means 218 causes first communication means 212, second communication means 213, and third communication means 217 to execute communication processing alternately at a predetermined cycle (for example, at 100 ms cycle). In addition, control means 218 synchronizes communication processing of the player's game device 6 with those of other game devices 6 during multi-play.

Now, an exemplary communication operation performed by game device 6 will be described with reference to FIGS. 11 to 13.

First, in each of first-type groups G11 to G16 shown in FIG. 11, each of nodes N belonging to a first-type group G1 sends its game data to the other node N belonging to the same first-type group G1 as the node N. As a result of the communication processing, for example, node N111 receives game data of node N112.

Second, in each of second-type groups G21 to G26 shown in FIG. 12, each of nodes N belonging to a second-type group G2 sends its game data and game data received from the other node N belonging to a same first-type group as the node N, to the other node N belonging to the same second-type group as the node N. As a result of the communication processing, for example, node N111 receives game data of nodes N121 and N122 from node N121.

Third, in each of third-type groups G31 to G34 shown in FIG. 13, each of nodes N belonging to a third-type group G3 sends its game data, game data received from the other node N belonging to a same first-type group as the node N, and game data received from the other node N belonging to a same second-type group as the node N, to the all other nodes N belonging to the same third-type group as the node N. As a result of the communication processing, for example, node N111 receives game data of nodes N211, N212, N221, and N222 from node N211, and receives game data of nodes N311, N312, N321, and N322 from node N311. After the set of communication processing, node N111 receives game data of all of the other nodes N. Not only node N111, but each of all nodes N111 to N322 receives game data of all of the other nodes N.

In the set of communication processing shown in FIGS. 11 to 13, each of nodes N is required to send game data to a total of four nodes N so that all nodes N share game data with each other. In other words, each node N is required to send a total of four packets. Taking node N111 as an example, node N111 is required to send its game data to a total of four nodes N including nodes N112, N121, N211, and N311. In contrast, in a conventional full mesh network, all nodes N are each required to send game data to a total of 11 nodes N so that all nodes N share game data with each other. In other words, each node N is required to send a total of 11 packets. This is because in a conventional full mesh network, node N is required to send game data to all of the other 11 nodes N. Upon comparison with such an example it is apparent that use of the communication processing shown in FIGS. 11 to 13 achieves a substantial reduction in connection-count and packet-count by an amount of one third; in short, communication efficiency is greatly improved.

The foregoing is a description of a case where three types of groups are set; however, the number of group types may be four or more. Below, a general description of a case is given in which a number of group types is four or more. Assuming that the number of group types is "n," a group setting means sets groups such that each of game devices belongs to any one of at least one group for each of a first-type group(s) to a n-th-type group(s). The number of communication means is "n." Among the "n" number of communication means, first communication means 212 shares game data in a first-type group, as described above. Second communication means 213 shares, in a second-type group, game data received using first communication means 212, as described above. A (n–1)-th communication means shares, in a (n–1)-th-type group, game data received using first communication means 212 to a (n–2)-th communication means. A n-th communication means shares, in a n-th-type group, game data received using first communication means 212 to the n-th communication means. In short, each of the communication means shares, in a group whose type corresponds to the number assigned to the communication means, game data received using one or more communication means whose number is smaller than that of the communication means. By causing the "n" number of communication means to execute communication processing alternately, game devices are able to share game data with each other.

2-2. Modification 2

Group setting means 211 may determine the number of group types according to a game. Specifically, group setting means 211 may determine the number of group types according to a predetermined maximum number of players of a game. For example, when a game is played a maximum number of players of which is less than 100, group setting means 211 may set the number of group types to two; and when a game is played a maximum number of players of which is 100 or more, group setting means 211 may set the number of group types to three. To determine the number of group types, group setting means 211 may, for example, refer to a table in which ranges of a maximum number of players or game names are associated with a number of group types. As another example, group setting means 211 may determine a number of group types based on a number of players who are to actually participate in multi-play, rather than on a maximum number of players.

2-3. Modification 3

Instead of master game device 2, match-making server 3 may set groups. In other words, match-making server 3 may include the function of group setting means 211. In such a case, match-making server 3, instead of master game device 2, receives communication environment data and communication availability data to set groups, and sends group data D5 on set groups to each of game devices 2 that are to participate in multi-play.

2-4. Modification 4

In the communication operation shown in FIG. 8A, when a P2P communication disabled device appears during multi-play, another game device 2 compensates for the P2P communication disabled device thereby to maintain multi-play. However, in place of deploying this compensation method, the P2P communication disabled device may instead be replaced with relay server 4 to maintain multi-play. In such a case, group setting means 211 of master game device 2, upon detecting a P2P communication disabled device during multi-play, resets groups to replace the P2P communication disabled device with relay server 4. Specifically, group setting means 211 resets groups such that relay server 4, instead of the P2P communication disabled device, belongs to any one of first-type groups and to any one of second-type groups. Subsequently, group setting means 211 stores group data D5 on reset groups in volatile memory 23, and sends group data D5 to each of game devices participating in multi-play.

2-5. Modification 5

First communication means 212, upon detecting during multi-play that another game device 2 belonging to a same first-type group as the player's game device 2 has become a P2P communication disabled device, performs processing to compensate for the P2P communication disabled device, as described above. Specifically, first communication means 212 sends, in a round-robin manner, game data of the player's game device 2 to other game devices 2 belonging to a same second-type group as the P2P communication disabled device. However, this transmission method is merely one example of a transmission method for distributing a processing load on the receiving side. Another transmission method is described with reference to FIG. 8A. In the another transmission method, nodes N12 to N15 may send game data to different nodes N. For example, node N12 sends game data to node N21, node N13 sends game data node N31, node N14 sends game data to node N41, and node N15 sends game data to node N51 to achieve distribution of a processing load on the receiving side.

2-6. Modification 6

Group setting means 211 may determine numbers of constituent devices (in other words, numbers of groups) of a first-type group and a second-type group according to a transmission data size of game devices 2. Specifically, group setting means 211 may determine numbers of constituent devices (in other words, numbers of groups) of a first-type group and a second-type group such that an amount of data sent between second-type groups does not exceed a maximum payload size of a packet. For example, it can be assumed that a maximum payload size of a packet is 1,200 bytes, and a size of game data is 300 bytes, and based on such an assumption, a number of packets to be sent by each game device 2 is considered. Assuming that 64 game devices 2 participate in multi-play, and that a first-type group and a second-type group are formed by eight game devices 2, respectively, each game device 2 sends seven packets in a first-type group and sends 14 packets in a second-type group. Accordingly, each game device 2 sends a total of 21 packets. It is of note that the reason why each game device 2 sends 14 packets, instead of seven packets in a second-type group, is that each game device 2 is required to send 2,400 bytes (300 bytes*8 devices) of game data, and this data size exceeds the maximum payload size; accordingly, two packets are required to be sent. In contrast, assuming that a first-type group is formed with four game devices 2, and a second-type group is formed with six game devices 2, each game device 2 sends three packets in a first-type group, and sends 15 packets in a second-type group. Accordingly, each game device 2 sends a total of 18 packets. In this case, each game device 2 sends 1,200 bytes (300 bytes*4 devices) of game data, and this data size does not exceed the maximum payload size; accordingly, it is not necessary to send two packets. As described in the foregoing, depending on a transmission data size of game devices 2, communication efficiency can be improved by making larger a number of constituent devices of a second-type group relative to a first-type group.

2-7. Modification 7

Group setting means 211 may include a P2P communication disabled group in second-type groups, instead of in first-type groups. In a case where a P2P communication disabled group is included in second-type groups, first communication means 212, upon detecting that a player's game device 2 belongs to a P2P communication disabled group included in second-type groups, exchanges game data with other game devices 2 via relay server 4. Second communication means 213, upon detecting that the player's game device 2 belongs to a P2P communication disabled group included in second-type groups, exchanges game data with other game devices 2 via relay server 4.

In the case where a P2P communication disabled group is included in second-type groups, an amount of data sent by relay server 4 is reduced. Assuming that a transmission data size of game devices 2 is d, and an amount of data sent by relay server 4 is considered. If it is also assumed that a P2P communication disabled group is included in first-type groups, and that a first-type group is formed with an N number of game devices 2 and a second-type group is formed with an M number of game devices 2, an amount of data sent by relay server 4 in response to transmission by game devices 2 belonging to the P2P communication disabled group is expressed by expression (1).

$$d*(N-1)+Nd*(M-1)=NMd-d \quad (1)$$

An amount of data sent by relay server 4 in response to transmission by game device 2 belonging to a first-type group other than the P2P communication disabled group is expressed by expression (2).

$$Nd*1=Nd \quad (2)$$

In contrast, assuming that a P2P communication disabled group is included in second-type groups, and that a first-type group is formed by an M number of game devices 2 and a second-type group is formed by an N number of game devices 2, an amount of data sent by relay server 4 in response to transmission by game devices 2 belonging to the P2P communication disabled group is expressed by expression (3).

$$d*(M-1)+Md*(N-1)=NMd-d \quad (3)$$

An amount of data sent by relay server 4 in response to transmission by game device 2 belonging to a second-type group other than the P2P communication disabled group is expressed by expression (4).

$$d*1=d \quad (4)$$

As will be clear from the foregoing, an amount of data sent by relay server 4 is smaller when a P2P communication disabled group is included in second-type groups.

2-8. Modification 8

Game device 2 need not necessarily be a dedicated game machine, and may be a communication device capable of running game program P, such as a smartphone, a tablet device, or a stationary PC. Assuming that game device 2 is a communication device with a built-in microphone, game device 2 may exchange voice data, instead of or in addition to game data, with other game devices 2 to perform voice chat.

2-9. Modification 9

Game device 2 may perform any type of communication not using relay server 4, other than P2P communication to share game data with other game devices 2.

2-10. Modification 10

Control means 214 causes communication processing to be performed at a predetermined cycle (for example, at 100 ms cycle). Instead of this, control means 214 may cause game data to be sent according to a state of a game. In a case where game data is sent according to a state of a game, a probability of inclusion of plural items of game data in a packet is reduced; however, a similar improvement in efficiency is achieved with regard to a connection count.

2-11. Modification 11

Communication system 1 includes match-making server 3, relay server 4, and communication environment determination server, some of which may be integrated into a single server.

What is claimed is:

1. A communication system in which communication devices communicate with each other, the communication system comprising at least one processor configured to execute:
    setting communication device groups such that each of the communication devices is included in both (i) one of at least one first-type group and (ii) one of at least one second-type group; and
    alternately performing first communication processing and second communication processing, wherein
    the first communication processing comprises each respective communication device in each of the at least one first-type group sending its own data to other communication devices included in the same first-type group as the respective communication device, and
    the second communication processing comprises each respective communication device in each of the at least one second-type group sending its own data and data received from other communication devices included in the same first-type group as the respective communication device, to other communication devices included in the same second-type group.

2. The communication system according to claim 1, wherein communication devices included in a particular first-type group other than one communication device of the communication devices included in the particular first-type group do not overlap with communication devices included in a particular second-type group other than the one communication device of the communication devices.

3. The communication system according to claim 1, wherein each of the first-type groups and each of the second-type groups include a plurality of communication devices, one of the plurality of communication devices included in one of the first-type groups is included in one of the second-type groups, and other communication devices included in the one of the first-type groups are not included in the one of the second-type groups.

4. The communication system according to claim 1, wherein -each one of the first-type groups differs from each one of the second-type groups in their respective combinations of constituent communication devices.

5. The communication system according to claim 1, wherein the at least one processor is configured to alternately perform the first communication processing and the second communication processing at a predetermined cycle.

6. The communication system according to claim 1, wherein:
    the at least one processor is configured to execute setting the communication device groups such that communication devices that cannot directly communicate with other devices are included in a direct communication disabled group included in the at least one first-type group;
    the first communication processing comprises each of the communication devices belonging to the direct communication disabled group sending, via a relay device, its own data to all other communication devices belonging to the direct communication disabled group; and the second communication processing comprises each of the communication devices included in the direct communication disabled group and to a second-type group sending, via the relay device, its own data and data received from all other communication devices included in the direct communication disabled group, to all other communication devices included in the same second-type group, and receiving, via the relay device, from each of the all other communication devices included in the same second-type group, data of the other communication device and data that the other communication device has received from all other communication devices included in a same first-type group as the other communication device.

7. The communication system according to claim 1, wherein the at least one processor is configured to execute setting the communication device groups so that a relay device, instead of a communication device that cannot directly communicate with other communication devices, is included in both one of the at least one first-type group, and one of the at least one second-type group.

8. The communication system according to claim 1, wherein the at least one processor is configured to execute performing the first communication processing so that, instead of a communication disabled communication device that is unable to communicate with other communication devices, all other communication devices included in a same first-type group as the communication disabled communication device send data to other communication devices included in a same second-type group as the communication disabled communication device.

9. The communication system according to claim 8, wherein the at least one processor is configured to execute performing the first communication processing so that each of the all other communication devices included in the same first-type group as the communication disabled communication device sends data to another communication device included in the same second-type group as the communication disabled communication device, the other communication device having been determined according to a specified condition.

10. The communication system according to claim 1, wherein:
the data comprises game data; and
in each of the communication devices, the at least one processor is configured to execute performing game processing using game data of the communication device and game data received from other communication devices.

11. The communication system according to claim 10, wherein, in each of the communication devices, the at least one processor is configured to execute performing the game processing using game data of the communication device and game data received from other communication devices, while synchronizing a game event of the communication device with that of the other communication devices.

12. The communication system according to claim 1, wherein:
the at least one processor is configured to execute setting the communication device groups such that each of the communication devices is further included in one of at least one third-type group; and
the at least one processor is configured to execute third communication processing so that in each of the at least one third-type group, each of communication devices included in a third-type group sends its own data, data received from other communication devices included in a same first-type group as the communication device, and data received from other communication devices included in a same second-type group as the communication device, to other communication devices included in the same third-type group as the communication device.

13. A communication device comprising:
communication circuitry; and
at least one processor configured to:
access a memory storing communication device group data for a plurality of communication devices in which each communication device is included in both one of at least one first-type communication device group and one of at least one second-type communication device group; and
alternately perform first communication processing and second communication processing, wherein
the first communication processing comprises controlling the communication circuitry to send own data of the communication device to all other communication devices included in a same first-type communication device group as the communication device and receive respective own data from each of the all other communication devices included in the same first-type communication device group as the communication device, and
the second communication processing comprises controlling the communication circuitry to send the own data of the communication device and the respective own data received from each of the all other communication devices included in the same first-type communication device group as the communication device, to all other communication devices included in a same second-type communication device group as the communication device, and receive respective own data from each of the all other communication devices included in the same second-type communication device group as the communication device, and data that each respective one of the other communication devices included in the same second-type communication device group as the communication device has received from each of all other communication devices included in a same first-type communication device group as the respective one of the other communication devices.

14. The communication device according to claim 13, wherein the at least one processor is configured to execute setting communication device groups such that each of communication devices is included in any one of the at least one first-type communication device group, and in any one of the at least one second-type communication device group.

15. A non-transitory computer readable storage medium storing therein a program executable by one or more computer processors of a communication device, wherein the program, when executed, causes the one or more computer processors to execute:
accessing a memory storing communication device group data for a plurality of communication devices in which each communication device is included in both one of at least one first-type communication device group and one of at least one second-type communication device group; and
alternately performing first communication processing and second communication processing, wherein
the first communication processing comprises controlling communication circuitry of the communication device to send own data of the communication device to all other communication devices included in a same first-type communication device group as the communication device, and receive respective own data from each of the all other communication devices included in the same first-type communication device group as the communication device, and the second communication processing comprises controlling the communication circuitry to send the own data of the communication device and the respective own data received from each of the all other communication devices included in the same first-type communication device group as the communication device, to all other communication devices included in a same second-type communication device group as the communication device, and controlling receive respective own data from each of the all other communication devices included in the same second-type communication device group as the communication device, and data that each respective one of the other communication devices included in the same second-type communication device group as the communication device has received from each of all other communication devices included in a same first-type communication device group as the respective one of the other communication devices.

16. A communication method performed by a communication device, the communication method comprising:

accessing a memory storing communication device group data for a plurality of communication devices in which each communication device is included in both one of at least one first-type communication device group and one of at least one second-type communication device group; and alternately performing first communication processing and second communication processing, wherein the first communication processing comprises sending own data of the communication device to all other communication devices included in a same first-type communication device group as the communication device, and receiving respective own data from each of the all other communication devices included in the same first-type communication device group as the communication device, and the second communication processing comprises sending the own data of the communication device and the respective own data received from each of the all other communication devices included in the same first-type communication device group as the communication device, to all other communication devices included in a same second-type communication device group as the communication device, and receiving respective own data from each of the all other communication devices included in the same second-type communication device group as the communication device, and data that each respective one of the other communication devices included in the same second-type communication device group as the communication device has received from each of all other communication devices included in a same first-type communication device group as the respective one of the other communication devices.

17. The communication device according to claim 13, wherein the first communication processing and the second communication processing are alternately performed at a predetermined cycle.

18. The non-transitory computer readable storage medium according to claim 15, wherein the first communication processing and the second communication processing are alternately performed at a predetermined cycle.

19. The communication method according to claim 16, wherein the first communication processing and the second communication processing are alternately performed at a predetermined cycle.

* * * * *